April 5, 1932.  W. H. O'CONNOR  1,852,187
PORK SKINNING MACHINE
Filed Dec. 27, 1926    3 Sheets-Sheet 1
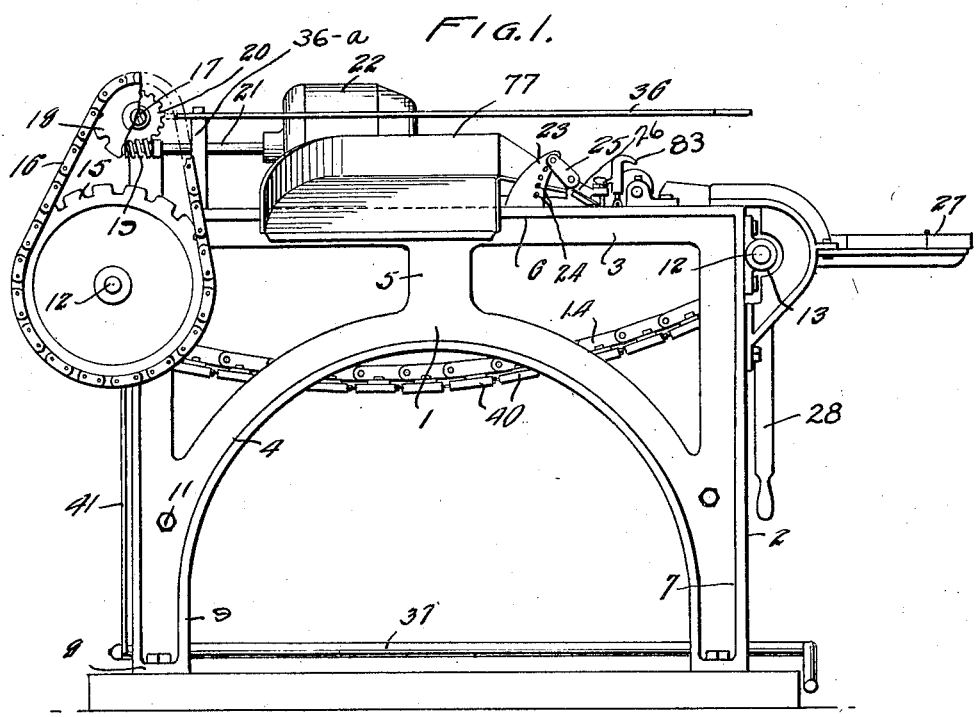
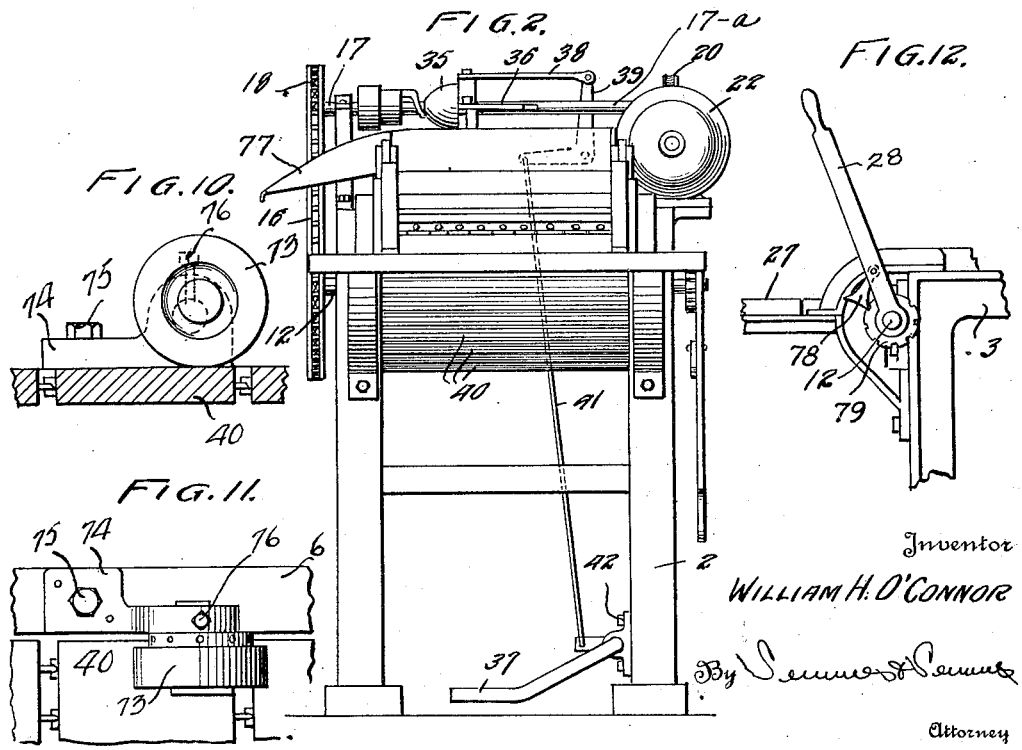
Inventor
WILLIAM H. O'CONNOR
Attorney

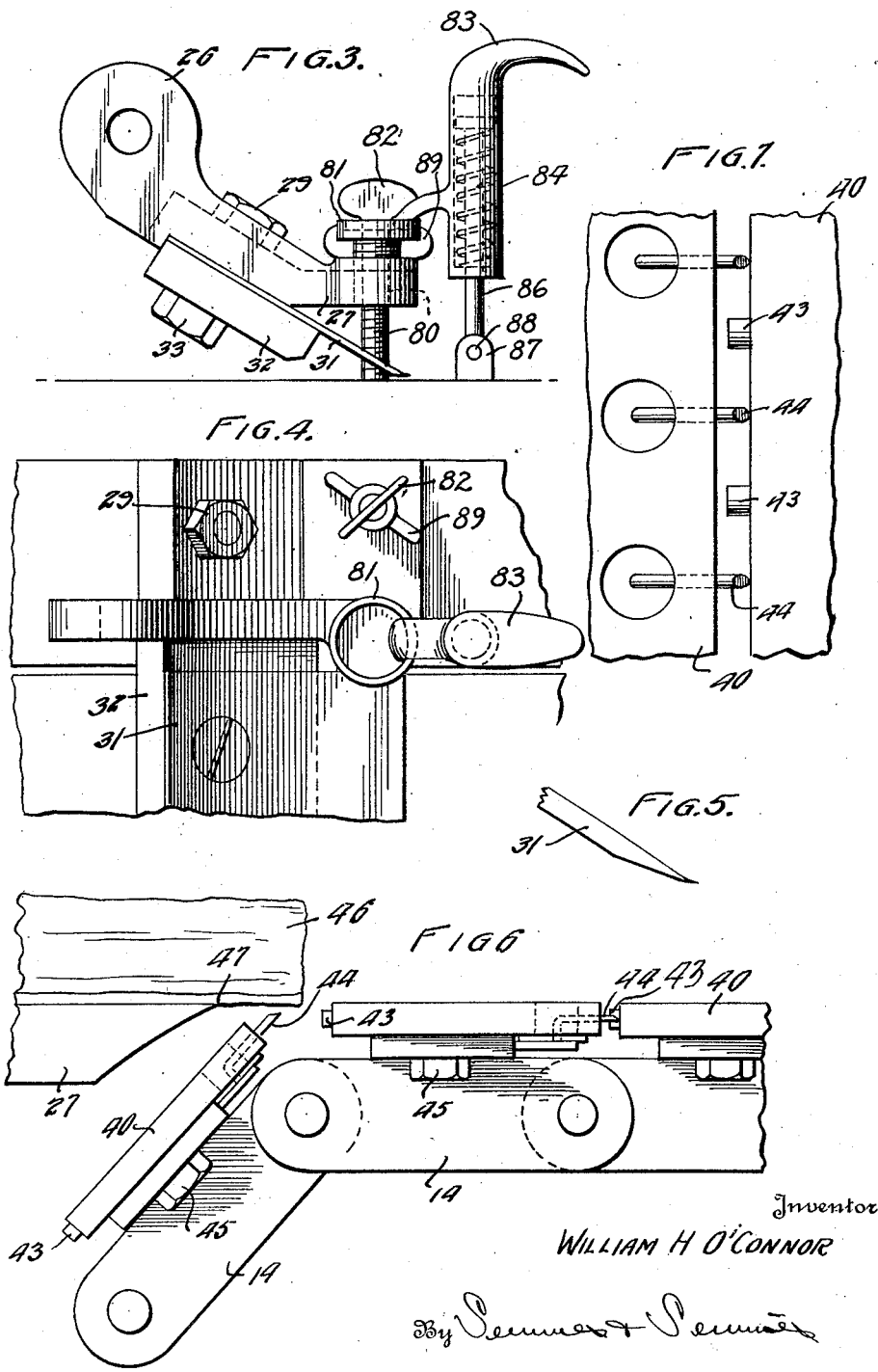

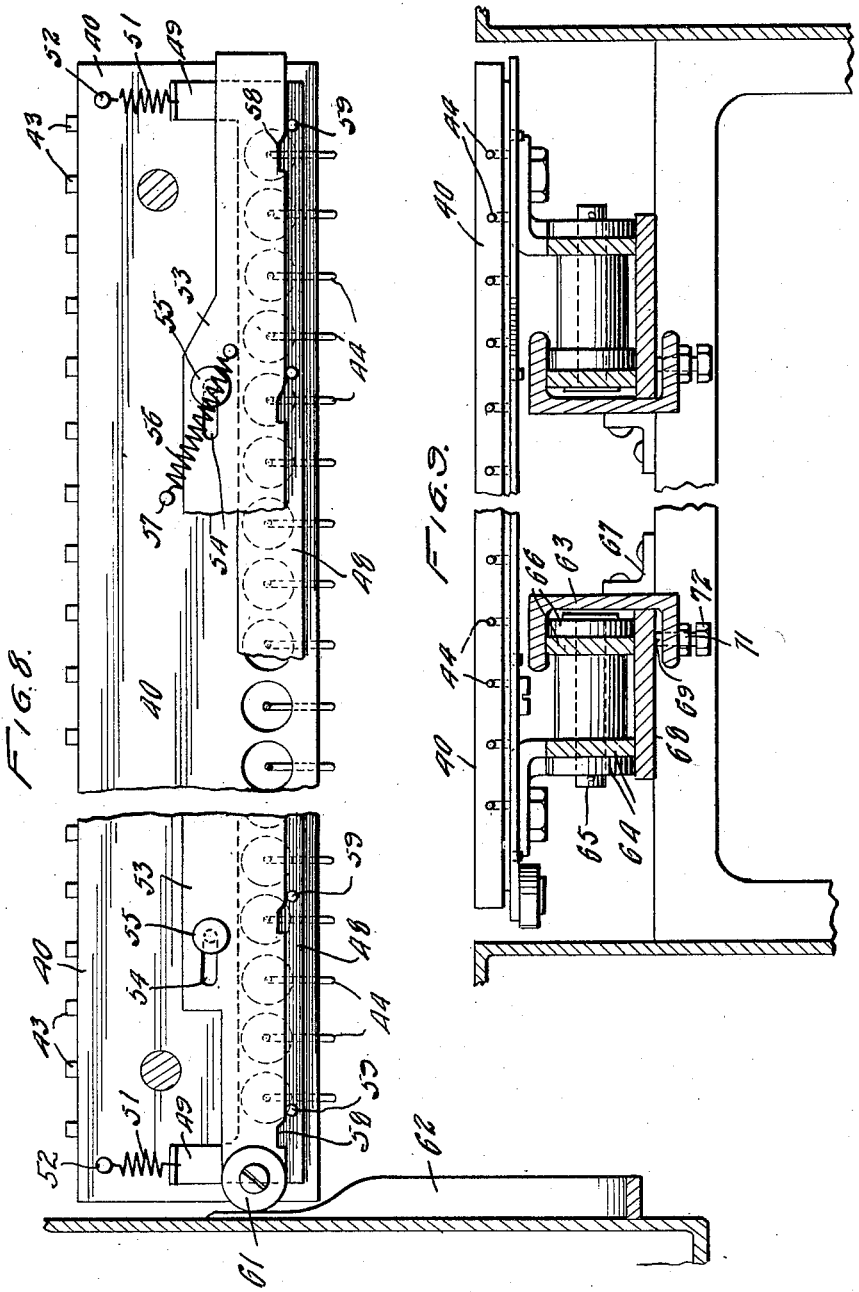

Patented Apr. 5, 1932

1,852,187

UNITED STATES PATENT OFFICE

WILLIAM H. O'CONNOR, OF NEWARK, NEW JERSEY

PORK SKINNING MACHINE

Application filed December 27, 1926. Serial No. 157,146.

This invention relates in general to improvements in skinning machines and more particularly has reference to improvements in a pork skinning machine generally disclosed in a co-pending application Serial No. 69,038 filed March 14, 1925.

While the machine forming the subject matter of the above mentioned application constitutes an operative apparatus for removing the skin from pork and other meats, the improvements embodied in this invention are adapted to render the mechanism more efficient.

Heretofore in the art there have not been provided adequate protective devices on machines of this character, causing the operation thereof to be extremely hazardous. Likewise such devices have been ill equipped in respect to control mechanism, a factor that has tended to detract from the maximum efficiency as well as increase the danger element.

The various mechanisms used previous to this time to perform the actual skinning operation have further proved generally lacking in efficiency in that it has been necessary to retract the product after it has passed through the machine, thereby creating an additional step and consequent economic loss as well as lowering the market value of the product in that the fat left adhering to the skin is a loss from the worth of the meat and causes a distinct decrease in the value of the skin.

An object of this invention is to provide an improved skinning machine provided with adequate protection against common operative inadvertence.

Another object of this invention is to provide a skinning machine having a reciprocal manual and pedal control mechanism adapted to render the mechanism of the machine more efficient in operation and increase the safety factor.

Still another object of this invention is to provide a skinning machine having a skinning mechanism adapted to sever the fat from the skin at the actual point of adhesion thereby dispensing with an unnecessary step heretofore essential, and the production of a commodity of greater market value.

Yet another object of this invention is to provide a skinning machine having an improved receiving mechanism adapted to facilitate the reception of the meat and so positioned as to allow the fat to be more easily severed from the skin at the actual point of adhesion.

A further object of this invention is to provide a skinning machine having an improved release mechanism adapted to facilitate the removal of a product after it has passed through the machine.

A still further object of this invention is to provide a skinning machine having a mechanism adapted to maintain the conveyor elements on an even surface when approaching the cutting element.

Yet a further object of this invention is to provide a skinning machine having a conveyor mechanism adapted to maintain an even surface and prevent soiling the product.

This invention consists in general of an improved skinning device embodying the general principles of the machine disclosed in my co-pending application referred to above, but having refinements adapted to give the maximum efficiency of operation.

The machine is equipped with protective shields to guard against common inadvertence and also a reciprocal control mechanism adapted to lend greater facility of operation.

An improved cutting mechanism has been provided designed to sever the fat from the rind at the actual point of adhesion, thereby dispensing with a step of operation heretofore necessary and producing a product of higher marketable value and thus allowing a distinct economic gain. The slats comprising the conveyor element have had installed a mechanism designed to facilitate the reception and release of the stock to and from the machine and mounted on the frame in a manner to maintain an even surface and prevent buckling, especially in proximity to the cutting element. There is also embodied in the apparatus a support for the reception of the product adapted to be tilted to facilitate the reception of the stock on the machine and a mechanism in engagement therewith to fix the support at any desired angle.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification:

Figure 1 is a side elevational view of the improved skinning machine forming the subject matter of this invention;

Fig. 2 is a front elevational view of the improved skinning machine;

Fig. 3 is a side elevational view of the improved skinning mechanism;

Fig. 4 is a top plan view of the improved skinning mechanism;

Fig. 5 is a side elevational view of the improved knife blade;

Fig. 6 is a side elevational view of the improved conveyor mechanism shown in a receiving position;

Fig. 7 is a top plan view showing a double section of the conveyor mechanism;

Fig. 8 is a top plan view showing the improved slat comprising the conveyor mechanism shown approaching release;

Fig. 9 is a front elevation sectional view of the mechanism for preventing buckling of the conveyor slats;

Fig. 10 is a side elevational sectional view of the mechanism for maintaining the slats on an even surface when approaching the knife blades;

Fig. 11 is a top plan view of Fig. 10;

Fig. 12 is a side elevational view of the slat extending and retracting mechanism.

Referring by numerals to the drawings wherein the same numerals designate the same elements throughout and more particularly to Figure 1, 1 represents a rectangular frame comprising corresponding side sections preferably cast in one piece with vertical sections 2 connected at the top by a horizontal section 3 also preferably integrally cast. The corner sections 2 and the horizontal sections 3 are connected and braced by an arcuate plate 4 extending from the base of one corner section to the base of the corresponding corner section, and connected centrally to the horizontal section 3 by a web 5. The side sections are further strengthened and made rigid by a flange 6 on the horizontal section 3 formed integral therewith, and with flanges 7 on the corner sections 2. The corner sections 2 are provided with base plates 8 formed integral with a flange 9 on the arcuate base plate 4.

The side sections are connected by cross bars 11 mounted between the corner sections and bolted thereto. It is of course to be understood that any form of cross bracing may be employed which will not interfere with the operative parts of the machine, but yet will impart strength and rigidity to the frame.

Corresponding transverse parallel shafts 12 are journaled on the respective ends of the frame in bearings 13 bolted to the flanges 7 on the corner sections 2. The shafts 12 are provided with a plurality of oppositely disposed sprocket wheels, not shown, which are connected by corresponding parallel link chains 14 supporting slats forming the conveyor element of particular construction, to be hereinafter described.

One of the shafts 12 is provided with a sprocket pulley 15 connected by a chain 16 to a driving mechanism mounted on top of the frame, comprising a shaft 17 mounted parallel to the shaft 12, and having a sprocket pulley 18 secured thereon adapted to engage the chain 16. Mounted upon shaft 17 is a conventional friction clutch 35 which is adapted to connect and disconnect shaft 17 from engagement with shaft 17—a. The sprocket pulley 18 is rotated by a gear 20 engaged by a worm gear 19 rotating with a shaft 21. The shaft 21 is operated by an electric motor 22 supported on the frame by any suitable means. Clutch 35 is adapted to be operated optionally by either a hand lever 36 pivotally mounted on bracket 36—a to swing in a horizontal plane as shown in Figures 1 and 2, or by means of a foot pedal mechanism, consisting of a pedal 37 pivotally mounted by a bracket, 42, to one leg, 2, of the frame of the machine and connected by a link 41 to a bell crank lever 39 and a second link 38 to the clutch mechanism 35. By this arrangement the operator can quickly and readily control the operation of the machine by hand or foot as may be most convenient. A conventional guard structure may be suitably secured over the driving gear to insure safety in case of inadvertence on the part of an operator. It is manifest that the position of the driving mechanism may be changed or any other form of motive power substituted to suit the particular requirements.

Mounted in alignment upon the flanges 6 of the top sections 3 are corresponding and oppositely disposed arcuate brackets 23 provided with a plurality of aligned apertures 24.

Adjustably mounted in the aligned apertures in each of the brackets are links 25 which are pivotally connected to arms of a pair of plates 26, formed as shown in Fig. 3. The plates 26 are provided with apertures designed to receive bolts 29. The bolts 29 are adapted to secure a knife blade 31 and a knife bar 32 to the plates 26. The plates 26 are provided with threaded apertures which receive adjusting screws 80, mounted in adjusted position by lock nuts 89. Positioned in other openings are threaded members provided with cups 81, adapted to receive a projecting lug associated with the resilient hook 83. Resting on cups 81 are a plurality of hollow tension hooks 83 provided with internal spiral springs 84 and shafts 86. The shafts 86 are held by bolts 88 to swivel members 87 mounted on the frame.

The knife blade 31, as shown in Figure 5, is ground to a keen edge and curled back by drawing a smooth hard steel along it leaving a sharp edge, smooth on the under side.

It has been demonstrated in practice that an ordinary fixed sharp knife edge will cut into the rind when skinning meat, especially if it be creased or of irregular contour, causing the production of imperfect material and necessitating the removal by hand of clinging particles of fat. These difficulties are surmounted by the employment of the knife blade embodied in this invention in conjunction with the improved tension support mechanism.

This blade held by tension is adapted to force the rind down on the table causing the straigtening of all irregularities and thus severing the fat at its natural dividing line without penetrating the rind. The blade is designed to be clamped at its back edge to the knife bar, 32, which is resiliently retained in position by the hooks 83 thus permitting the cutting edge to adjust itself to varying thickness of rind.

There is shown in Figure 6 a section of the conveyor mechanism comprising slats 40 mounted on the links of the chain 14 by bolts 45. The slats are provided with sharp pins 44 and blunt pins 43 projecting from the opposite sides. A feeding table 27 is adjustably mounted on the frame in the same plane as the slats 40 in their top position upon which is placed the stock having the usual fat portion 46 and a rind 47. The table 27 is hinged so that it may be raised or lowered to facilitate the introduction of the stock.

A lever 28 is keyed on the end of one of the shafts 12 and provided with a swinging pawl 32 adapted to engage a fixed ratchet 33. When the motor is not in operation the slats may be operated by turning the shaft 12 through the lever 28 and the slats fixed in position by engagement of the pawl 32 with the ratchet 33.

The slats 40 are mounted on the links 14 off center so that at the feeding table 27 the sharp pins 44 stand out tangent to the arc at the same time the adjoining slat with the blunt pins 43 is under the circle.

By this structure the skin is engaged by the pins 43 and 44 and drawn into the orifice and by slightly retarding the fat portion 46, only the skin 47 is retained.

The slats 40 are shown as advanced on the links 14, although it is manifest they may be retarded or on center if so desired. The sharp pins 44 are bent L-shaped and slipped in holes provided in the slats and welded to a pin bar 48, better shown in Figure 8. The slats 40 provided with blunt pins 43 and sharp pins 44 are secured to a pin bar 48. The pin bar 48 is provided on either end with L-shaped projections 49 secured to springs 51 held by screws or any other suitable means 52. Adapted to be superimposed over the pin bar 48 is a shift bar 53 having lateral slots 54 adapted to receive nuts 55 allowing transverse movement. There is further secured to the shift bar 53 a spring 56 extending in an angular plane and secured to the slat 40 by any suitable means 57. The front end of the shift bar 53 is provided at one end with a roller 61 adapted to engage a cam 62 located on one end of the machine.

The skin is released from the sharp pins 44 at the discharge end of the machine. The pin bar 48 is operated by the shift bar 53 and spring 56 by contacting with the cam 62 at the side of the machine so located, near the end, that when the slats make the turn, the particular slat at the time moves forward first which releases the skin from the blunt pins 43; then the shift bar roller contacts with the cam, causing the release of the pin bar and the consequent withdrawal of the sharp pins 44 from the skin leaving it free to drop.

When the shift bar roller has passed the cam, the opposite end of the bar touches the barrier to positively restore its position causing the pin bar to be moved forward and the sharp pins restored and held in place.

In Figure 9 is shown an improved means for holding the slats drawn on an even surface. A holder bar on top of the slats is objectionable in that it is not in line with the draught of the chain and has a tendency to cramp, especially when the stock held between the slats causes the bed to draw hard, and is further mechanically inefficient necessitating the replacement of the slats at frequent intervals as well as the ceiling of the product by the lubricants. This objectionable feature is overcome by the provision of a plurality of steel chains 64 having lugs 65 on one side only and straight bars 66 on the opposed side. A guide channel is provided for the chain to pass through, adapted to be adjusted and hold the slats in proper relation to prevent buckling, comprising a horizontal guide member 63 having right angle projections. The lower projection is designed to seat a guide bar 68 to support and guide the chain. The vertical guide bar is made secure by an angle support 67. Adjustment of the guide bar 68 is made through the medium of a lock bolt 69 having nuts 71, 72, provided in the lower horizontal flange of the vertical guide bar 63.

To further insure the firmness of the slats in proximity to the knife blade and to avoid any possibility of contact therewith, there is provided on each side of the frame a roller 73 mounted in a support 74 held to the flange 6 by a bolt 75, operating without resistance to the slat bed, as shown in Figures 10 and 11. The roller is supported on a stub shaft which is eccentrically mounted so that it may be rotated to adjust the roller to increase or decrease the distance between the conveyor and the knife. An adjustment may be maintained by the set screw 76.

The mode of operation of this machine may be readily understood. The stock is placed on the feeding table 27 which may be tilted to feed more easily.

The slats 40 are advanced on the links 14 as shown in Figure 6 so that at the feed table the sharp pins 44 stand out tangent to the arc, at the same time the adjoining slat with blunt pins 43 under the circle are further removed. By this arrangement the operator instead of being compelled to push the meat into the orifice is able by advancing the stock over the slat, to allow the skin to be engaged by the sharp pins and drawn by them into the orifice. During this operation by slightly retarding the advance of the fat portion of the stock only the skin is engaged by the pins allowing the fat to be severed from the rind at the actual point of adhesion.

The stock advancing on the slats will come in engagement with the cutting mechanism shown in Figure 3. The knife blade 31 will sever the stock at the point of adhesion of the fat and the rind and held firmly by tension spring 84 will crease out the irregularities of the skin and prevent cutting the rind or allowing any fat to remain. The fat thus severed from the rind is discharged through chute 77. The tension is regulated by the screw 81 which may be quickly released for adjustment by removing the hook member 83 after which operation it may be restored by replacing the hook.

When the stock has reached the discharge end of the machine the slats separate to release the skins as shown in Figure 8. The slats being set off center move apart obliquely causing their release from the blunt pins to be more positive. The sharp pins are further withdrawn at this point allowing the skin free to drop from the machine.

The slats are firmly held on an even surface as shown in Figure 9, wherein chains 65 are adapted to rest in guide channels 63 and 68 having an adjustment mechanism 69 to hold the slats in proper relation to the cutting mechanism and prevent buckling. The channel is in direct line with the draught of the chain allowing the use of the slat bed for its full width without soiling the product.

There is accomplished by this invention an improved skinning machine embodying refinements adapted to increase its efficiency and render the operation thereof less hazardous than in the past. At the point where the stock is received there is provided an adjustable feeding mechanism designed to receive the meat so as to hold it in such a position that the fat may be severed from the skin at the actual point of adhesion. The severing operation is performed by a cutting mechanism held under tension adapted to crease out the irregularities and prevent cutting the skin or allowing fat to remain adhering to it.

The slats are of such construction as to facilitate the reception of the stock and allow ready discharge of the skin after they have passed through the machine.

There is further accomplished an improved skinning machine having a conveyor mechanism held on an even plane to prevent buckling and capable of being utilized its full width without soiling the product.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A skinning machine comprising means for cutting skin from meat, a conveyor adapted to move the meat to said cutting means, said conveyor comprising traction members formed of a plurality of links, and conveying elements mounted off center, relative to said links, pins mounted on said conveying elements and adapted by virtue of the off-center mounting of the said elements to pierce the skin of the meat and grip it to the conveyor.

2. A skinning machine comprising means for cutting skin from meat, a conveyor adapted to move the meat to said cutting means, said conveyor comprising a plurality of slats, a plurality of blunt pins positioned on one edge of the slats, a plurality of sharp pins positioned on the other edge of the slats, the sharp pins of one slat adapted to cooperate with the blunt pins of an adjacent slat to grip the skin to be separated.

3. A skinning machine comprising means for cutting skin from meat, a conveyor adapted to move the meat to said cutting means, said conveyor comprising a plurality of slats, a plurality of sharp pins on one edge of each of the slats, a plurality of blunt pins positioned on the other edge of each of the slats, the sharp pins of one slat adapted to cooperate with the blunt pins of an adjacent slat to grip the skin to be separated, and means for releasing the pins from the skin.

4. A skinning machine comprising a cutting element, a conveyor for moving material to be skinned relative to said cutting element, a plurality of rollers positioned adjacent said cutting element adapted to cooperate with the conveyor to prevent it from contacting with the cutting element, said rollers being mounted on an eccentric member adapted to be adjusted.

5. In a skinning machine of the class described, a knife, means for moving material to be skinned relatively to said knife, said knife being pivotally mounted, and means for resiliently retaining said knife in a predetermined position, and means associated with said knife for varying the tension of said resilient means.

6. In a machine of the class described, a cutting mechanism, means for moving material to be skinned relative to said cutting mechanism, said cutting mechanism comprising a blade holder pivotally mounted, a blade carried thereby, means for limiting the movement of said holder and blade toward said conveyor and means for forcing said holder and blade toward said conveyor.

7. In a machine of the class described, a cutting mechanism, means for moving material to be skinned relative to said cutting mechanism, said cutting mechanism comprising a blade holder pivotally mounted, a blade carried thereby, resilient means for forcing said holder and blade toward said conveyor, means carried by the holder for adjusting the tension of said resilient means, and adjustable means carried by the holder for limiting the movement of the holder toward said conveyor.

8. A skinning machine comprising a frame, a cutting mechanism, a conveyor for moving material to be skinned relative to the cutting mechanism, said cutting mechanism comprising a blade holder pivotally mounted on the frame, a socket adjustably mounted on said blade holder, and a resiliently actuated member adapted to be detachably received in said socket to resiliently retain the blade holder in a predetermined position.

9. A skinning machine comprising a cutting mechanism, a conveyor for moving material to be skinned relative to said cutting mechanism, said conveyor comprising a plurality of links, a slat carried by each link, a bar slidably mounted on each of said slats, a plurality of pins in said bar adapted to engage the skin of material to be skinned, and means adapted to be actuated by a cam on the frame of the machine for operating the pin carrying bar to effect disengagement between the pins on skin.

10. A skinning machine comprising a cutting mechanism, a conveyor for moving material to be skinned relative to said cutting mechanism, said conveyor comprising a plurality of links, a slat carried by each link, a bar slidably mounted on each of said slats, a plurality of pins in said bar adapted to engage the skin of material to be skinned, means urging said bar in inoperative position, a shift bar carried by said slats for retaining said pin bar in operative position and means for shifting the bar, to permit the pin bar to move to inoperative position.

In testimony whereof I affix my signature.

WILLIAM H. O'CONNOR.